United States Patent [19]

Illingworth

[11] Patent Number: 5,424,933

[45] Date of Patent: Jun. 13, 1995

[54] RESONANT FORWARD CONVERTER CIRCUIT WITH CONTROL CIRCUIT FOR CONTROLLING SWITCHING TRANSISTOR ON AND OFF TIMES

[75] Inventor: Lewis Illingworth, Kensington, N.H.

[73] Assignee: Avionic Instruments, Inc., Avenel, N.J.

[21] Appl. No.: 176,523

[22] Filed: Jan. 3, 1994

[51] Int. Cl.[6] .......................................... H02M 3/335
[52] U.S. Cl. ........................................ 363/21; 363/56; 363/97
[58] Field of Search ................ 363/15, 16, 20, 21, 363/56, 97, 131

[56] References Cited

U.S. PATENT DOCUMENTS

| | | | |
|---|---|---|---|
| 4,438,485 | 3/1984 | Voigt | 363/21 |
| 5,029,269 | 7/1991 | Elliott et al. | 363/21 |
| 5,218,521 | 6/1993 | Augier | 363/56 |
| 5,325,282 | 6/1994 | Bansard | 363/21 |

*Primary Examiner*—A. D. Pellinen
*Assistant Examiner*—Y. J. Han
*Attorney, Agent, or Firm*—Herbert M. Shapiro

[57] ABSTRACT

An improved resonant forward dc-to-dc converter circuit includes control circuitry for achieving an optimal power cycle in which the transistor is either supplying current to the load or recovering in a sinusoidal manner, for limiting power loss by controlling the switch turn on time to the time when the switch collector voltage at recovery is at a mimimum, for maintaining an approximately constant turn off time and for providing pulse by pulse current mode control for high loop stability and superior transient response.

8 Claims, 4 Drawing Sheets

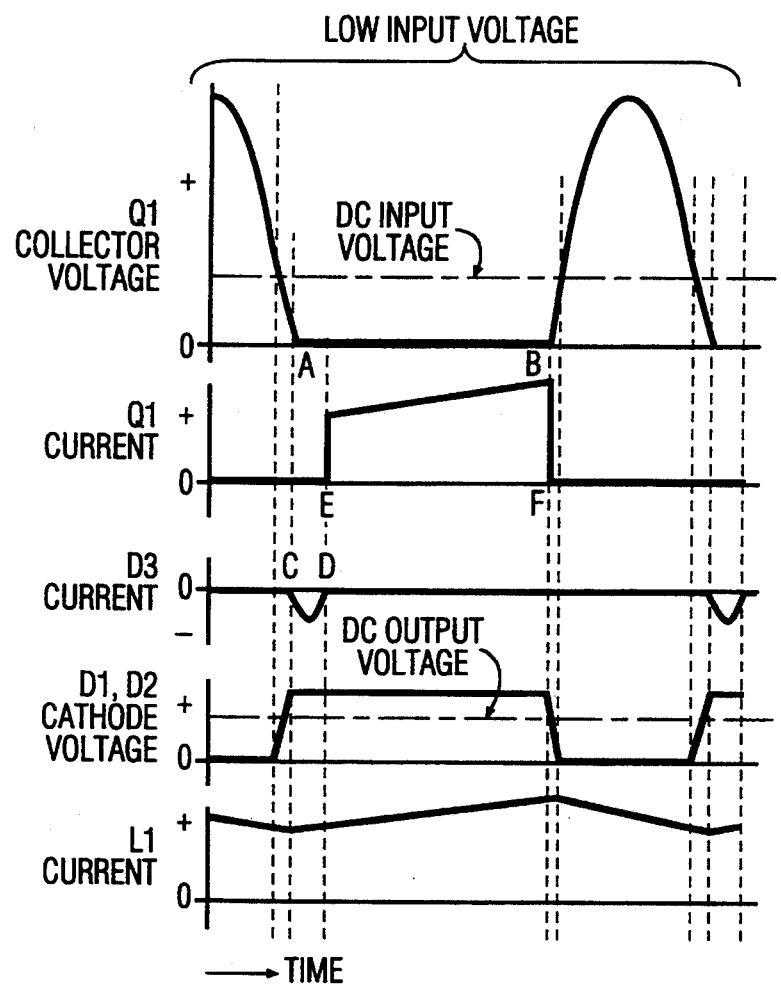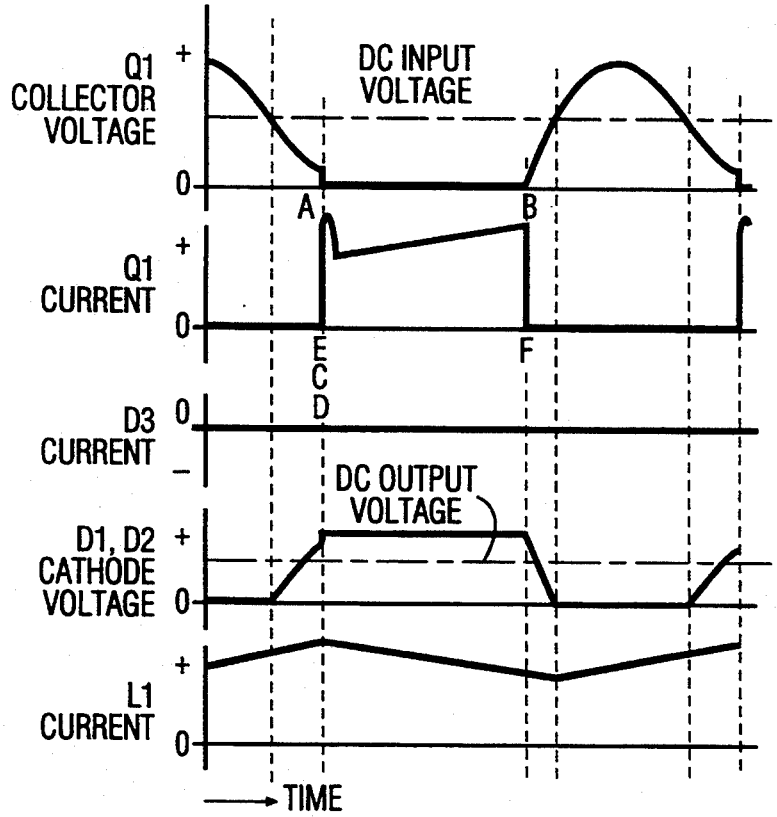

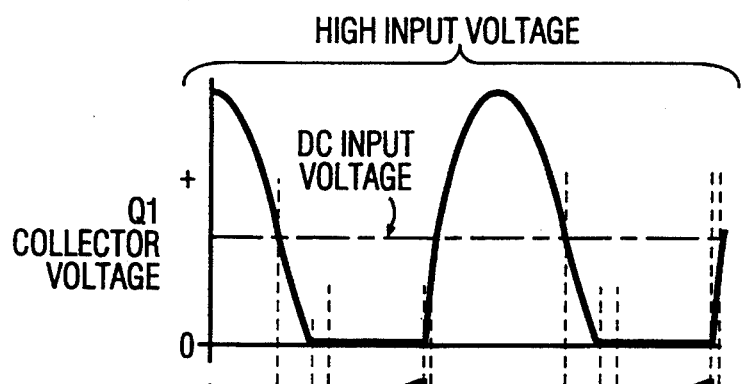
FIG. 4K  Q1 COLLECTOR VOLTAGE
FIG. 4L  Q1 CURRENT
FIG. 4M  D3 CURRENT
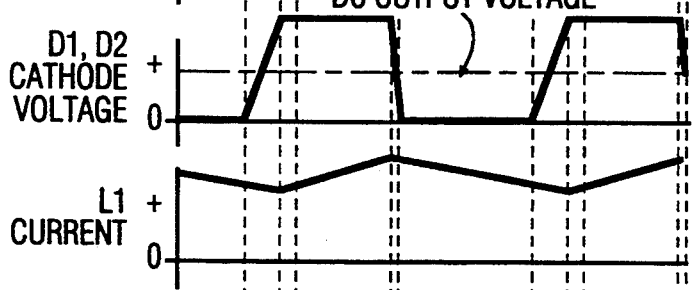
FIG. 4N  D1, D2 CATHODE VOLTAGE
FIG. 4O  L1 CURRENT
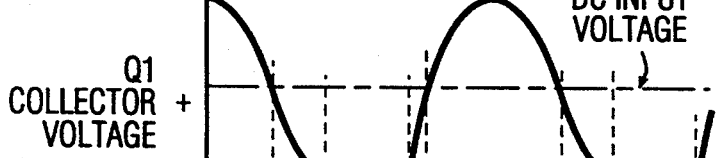
FIG. 4P  Q1 COLLECTOR VOLTAGE
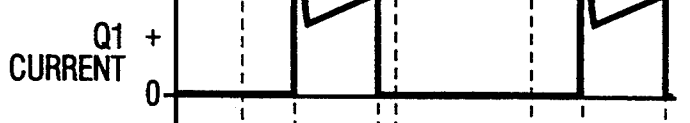
FIG. 4Q  Q1 CURRENT
FIG. 4R  D3 CURRENT
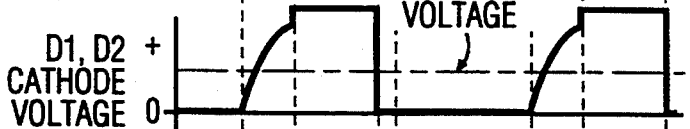
FIG. 4S  D1, D2 CATHODE VOLTAGE
FIG. 4T  L1 CURRENT

RESONANT FORWARD CONVERTER CIRCUIT WITH CONTROL CIRCUIT FOR CONTROLLING SWITCHING TRANSISTOR ON AND OFF TIMES

FIELD OF THE INVENTION

This invention relates to resonant dc-to-dc converters and more particularly to resonant switching power supply circuits exhibiting the characteristics of forward converter and resonant converter topologies and which are well suited to a wide range of input voltages.

BACKGROUND OF THE INVENTION

In a conventional forward converter, as shown in FIG. 1, a dc input voltage is connected to a solid state switch Q1 (101) through a transformer T1 primary winding 102. The resulting voltage developed across T1 secondary 103 is connected through diode D1 (104) and inductor L1 (105) to charge a capacitor C1 (106) and develop an output voltage. Current flowing into this secondary circuit is reflected back through transformer T1 so that switch 101 collector current is the load current, with variations due to fluctuations in inductor 105 current, and divided by transformer T1 primary to secondary ratio.

When switch 101 turns off inductor 105 inductor current carries diode 107 cathode negative to the negative output rail and the output voltage is maintained by capacitor 106 as inductor 105 current decays linearly with time. The converter maintains the desired output voltage by cycling switch 101 on and off at high frequency and controlling the ratio of turn on to turn of time. The current in inductor 105 ramps up linearly with time when switch 101 is turned on and ramps down when switch 101 is turned off and so displays a saw-tooth waveform for which the average current is the output current.

When transistor 101 turns off the collector voltage rises rapidly as the flux linking T1 primary 102 collapses. While T1 secondary 103 voltage is still positive the main moving force is inductor 105 secondary current reflected back to primary 102. This pulls the collector of transistor 101 positive until T1 primary 102 and secondary 103 voltages are substantially zero. The rate of increase of voltage at this time is rapid and occurs before switch 101 has had time to fully turn off. Thus turn off switching losses are high. At this point inductor 105 becomes clamped to the output negative rail and current flow back to primary 102 from this source is cut off. T1 primary 102 still has the magnetizing current, due to T1 primary 102 inductance, and this current carries switch 101 collector positive. If not clamped in some way the voltage tends to infinity and is destructive to switch 101, T1 and diode 104.

Conventional forward converters employ a variety of means to limit the collector swing of switch 101. Some resonant forward converters and the circuit described here, make use of a resonant primary circuit both to limit the rate of voltage increase when switch 101 turns off and also to control the maximum voltage reached by the collector of transistor 101.

A basic resonant forward converter is shown in FIG. 2. Capacitor C2 (201) is added and T10 primary inductance (Lp) controlled so that capacitor 201 and T10 primary inductance Lp form a parallel resonant circuit. It is assumed that there is a low impedance path to high frequency currents across the dc input. When switch 202 turns off inductor 203 current reflected through T10 flows into capacitor 201 and switch 202 collector voltage initially rises at a rate determined by capacitor 201 and the current flowing into it: inductor 203 current divided by T10 primary to secondary ratio. The rate of increase of voltage is relatively slow and switch 202 has time to fully turn off before an appreciable voltage has been developed across it. Thus turn off switching losses are very low. When T10 primary voltage becomes zero, and inductor 203 current flow is restricted to the secondary circuit, the remaining energy in T10 primary 204 due to magnetizing current now carries capacitor 201 and transistor 202 collector into a sinusoidal waveform for which the maximum voltage depends on circuit parameters. There are many variations of this basic resonant forward converter topology.

BRIEF DESCRIPTION OF THE INVENTION

Circuits constructed in accordance with the principles of the present invention incorporate topology of the prior art circuits and a control system which imbues those circuits with the following characteristics:

1. An optimum power cycle in which the switching transistor is either supplying current to the load or recovering in a sinusoidal manner-there is no dead time.

2. An optimum control of the switch turn on at a time when the resonant recovery has brought the collector voltage to a minimum. This minimizes turn on power loss.

3. A control system that automatically controls the duty cycle at any input voltage so that the switch collector peak voltage reaches the maximum value permitted by component ratings. This allows the maximum possible duty cycle and operation at much lower input voltages than is generally possible. Operation is possible with both high and low input voltages and the inputs voltage range approximates to the maximum.

4. The use of the switch resonant recovery overswing to maintain an approximately constant turn off time.

5. The application of pulse by pulse current mode control for high loop stability and excellent transient performance. This is of the constant turn off time current mode variety. However it does not suffer from the short term, sometimes called subcycle instability, not linked with loop response that is associated with constant off time current mode control when the switch turn on time is either greater or less than the fixed turn off time. In arrangements in accordance with the principles of the present invention, the turn off time is not tightly constrained but follows the natural switching waveform and timing errors do not accumulate to cause instability. The approximately constant turn off tinge and variable turn on time control provides an operating loop response that is very close to that for hysteretic current mode control.

This invention will be better understood by reference to the drawings in combination with the detailed description. As will be appreciated by those skilled in the art, the invention is applicable to dc-to-dc switching converter circuits, in general, and is not limited to the specific embodiments disclosed.

DETAILED DESCRIPTION OF THE DRAWINGS

FIG. 4 show low and high input voltage waveforms for the circuit of FIG. 3; and

DETAILED DESCRIPTION OF THE INVENTION

Figure 1:
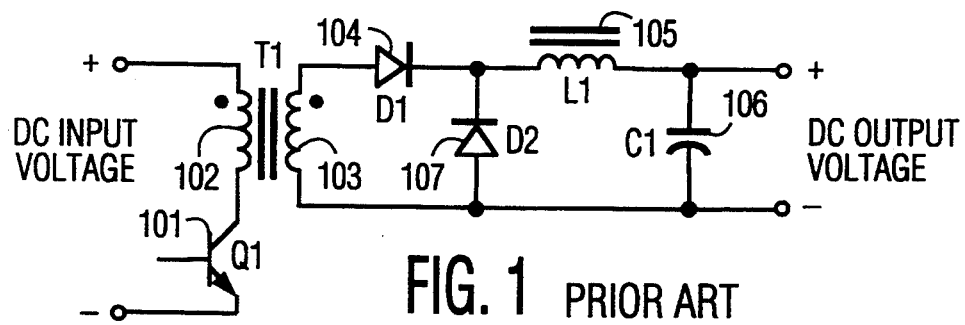
FIG. 1 shows a basic prior art forward converter circuit.
Figure 2:
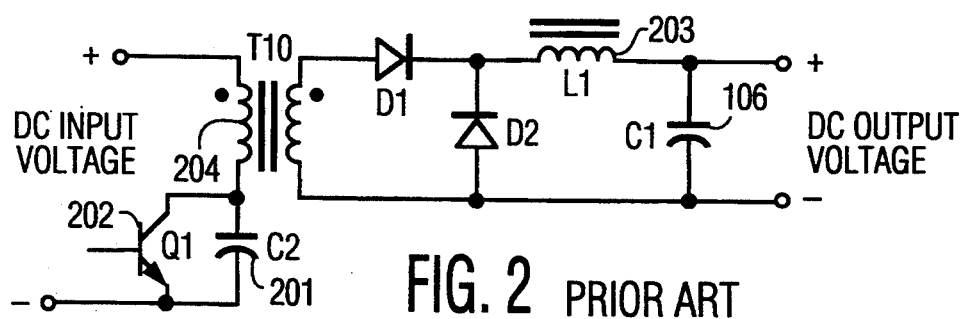
FIG. 2 shows a basic resonant forward converter circuit.
Figure 3:
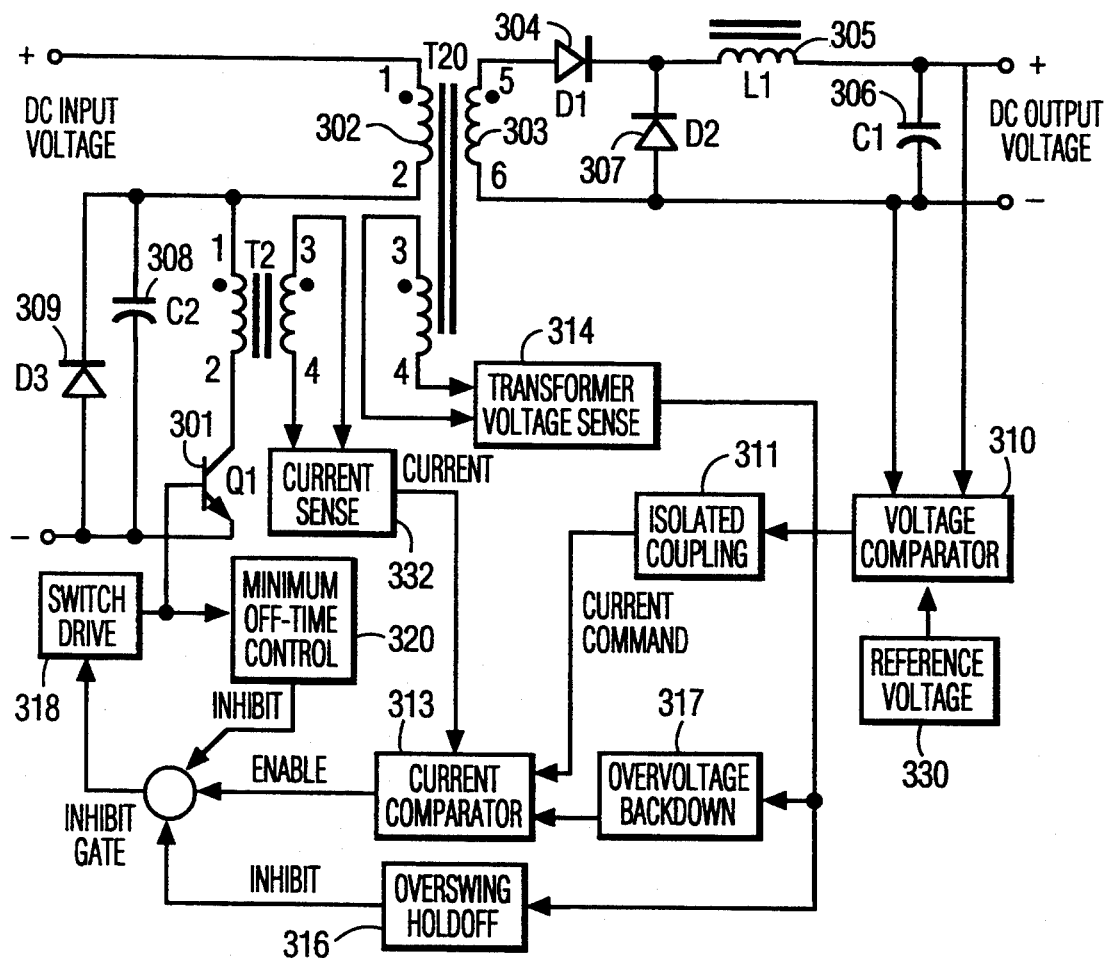
FIG. 3 shows a combined circuit and block diagram schematic of a circuit in accordance with one embodiment of the present invention.

A resonant converter circuit in accordance with the principles of the present invention is shown in combined block and schematic diagram form in FIG. 3. While the circuit of FIG. 3 is a dc to dc converter for which the input and output circuits are mutually isolated the circuit of FIG. 3 is illustrative only. The principles of the present invention are applicable to all forms of single switching transistor forward dc to dc converter, both isolated and non-isolated.

With reference to FIG. 3, switching transistor 301 is connected through transformer T20 primary winding 302 to a positive dc input. Transformer T20 secondary winding 303 is connected to diode 304, output inductor 305, capacitor 306 and on to the output load. Diode 307 is connected from the junction of diode 304 and inductor 305 to the output negative rail. Capacitor 308 is connected from transistor 301 collector (through) to the input negative rail. In addition diode 309 is added to bypass current from transistor 301 when transistor 301 collector is carried negative by the resonant circuit comprising capacitor 308 and T20 primary 302 inductance. Current transformer T2 is added to sense transistor 301 collector current. An additional winding 3, 4 on T1 senses transformer voltage.

The control system operation is as follows:

1. Output voltage is compared with a signal from reference voltage generator 330 by voltage comparator 310. In a power supply with an isolated output circuit the comparator output voltage, often termed the error voltage, may be connected to the main part of the control by isolated coupling circuit 311. The output voltage from isolated coupling circuit 311 is scaled to be equivalent to the current required to be carried by switch 301 and is termed the "Current Command". It is a positive voltage.

2. A current sense circuit 332 is connected across secondary 312 of transformer T2. Current sense circuit 332 has a terminating resistor such that the voltage developed across it, when switching transistor 301 is turned on, is proportional to the current carried by transistor 301 and is a negative voltage.

3. Current comparator 313 combines the output signals from isolated coupling circuit 311, current command, and the output from current sense circuit 332 together. When the current command is greater than current sense circuit 332 output, current comparator 313 output signal is positive allowing switching transistor 301 to remain turned on. When the current sense circuit 332 output signal exceeds the current command the current comparator 313 output signal is negative and switch 301 is turned off.

4. Transformer voltage sense circuit 314 senses the voltage across transformer T20. This may be done by sensing the voltage at the collector of transistor 301, or by sensing the voltage at secondary 303 or by using an entirely separate winding 315 as shown in FIG. 3. When transformer voltage sense circuit 314 indicates that switching transistor 301 collector voltage is below a predetermined positive value, the current comparator 313 output signal is inhibited and the switch held off. This prevents switch 301 from being turned on while it is in its sinusoidal recovery cycle and does not allow it to turn on again until the voltage has fallen to a substantially zero voltage.

The turn on point for switch 301 may be more easily determined by using transformer voltage sense circuit 314 to indicate the point at which the switch 301 collector begins to be less positive than the dc input voltage, and adding a fixed time delay to allow the collector to complete its sinusoidal recovery cycle. The timing is not critical and in converters with switching frequencies in the hundreds of KHz the delay time may be the transmission time through the control and switch drive circuitry together with switch 301's inherent turn on delay time. In FIG. 3 delay is appropriately effected by overswing holdoff circuit 316.

Turning transistor 301 on when it has either zero volts or only a very small voltage across it minimizes turn on switching losses and permits high operating efficiency.

5. Transformer voltage sense circuit 314 also drives overvoltage backdown circuit 317 which retains a negative representation of the positive peak value of transistor 301 resonant overswing. When this voltage exceeds a predetermined level the current command is pulled down to effectively lower the operating current limit. This in turn lowers the energy stored in each individual switching cycle which in turn reduces the overswing voltage. The function is termed the Overvoltage Backdown.

6. Switch drive circuit 318 converts the logic signal from current comparator 313 to a form suitable to drive the switching device base, if it is a bipolar transistor, or gate, if it is an FET or IGFET.

To provide a better understanding of the present invention shown, a more complete description of the operation of the circuit follows. To begin with assume a startup condition with voltage applied to the dc input. There is no output voltage at this time and voltage comparator circuit 310 output is fully positive. This voltage is transferred to the primary side by the isolated coupling circuit 311 after which it is termed the current command. It is a positive voltage that initially represents the maximum current permitted in the switching transistor 301 collector. With switch 301 turned off the current sense circuit 332 indicates zero and the current comparator 313 output is positive. The transformer voltage sense circuit 314 output shows zero volts and the Inhibit gate is disabled to allow a positive signal input to the switch drive 318 which swings positive and switch 301 turns on.

The DC input voltage appears across transformer T20 primary 302 and a voltage is generated across T20 secondary 303 with value determined by the primary to secondary ratio. Current flows through diode 304 and ramps up in inductor 305 to pull the output load positive and charge capacitor 306. Switch 301 remains turned on until its collector current, as determined by the current sense circuit 332 exceeds the current command. The current comparator 313 output moves negative and disables switch drive 318. Switch 301 turns off and its current falls to zero allowing the collector voltage to rise. Current in inductor 305 keeps flowing through diode 304 and back through T20 to primary 302 and into the resonant capacitor 308. Capacitor 308 charges at a rate proportional to the output current until T20 secondary 303 pin 5 voltage reaches zero, when diode 307 conducts and the current path back through the transformer is blocked. At this time the flux in transformer T20 is that represented by the magnetizing current; i.e., the current flowing into primary 302 at the end of switch 301 turn on cycle due to the primary inductance and the duration of the turn on time. Im=-(Vin/Lp)dt where Im is the magnetizing inductance, Vin the DC input voltage and Lp the primary inductance. T20 primary 302 and capacitor 308 form a resonant circuit with energy $\frac{1}{2}IM^2Lp$. The voltage waveform is now sinusoidal and swings positive to a peak value determined by the energy, Lp and the capacitance of capacitor 308, and then back down. When switch 301 turns off the minimum off time control circuit 320 steps in to inhibit the current comparator 313 output which would otherwise return positive as switch 301 current falls to zero. Minimum off time control circuit 320 also prevents switching at load extremes when there is little in the way of a recovery overswing. Once switch 301 collector has been carried more positive than the input voltage the transformer voltage sense circuit 314 steps in to inhibit the current comparator output and prevent the switching transistor 301 from turning on again. When the cycling energy is high the switch 301 collector voltage reduces until it is negative with respect to the negative input voltage, following which diode 309 conducts until excess energy is drained away. In this case there is energy recycling. When the energy is low the voltage reduction may not reach the negative rail but will round out at some voltage between the positive and negative inputs. In either case the inhibit from the transformer voltage sense circuit 314 is removed as switch 301 voltage reduces below the positive rail and the timing and delays inherent in switch drive circuit 318 cause switch 301 to re-turn on either some small time after switch 301 collector swings negative and diode 309 conducts or at the time at which switch 301 move as close to the negative rail as it is going to get.

Should the voltage have been higher than component ratings allow this will have been detected by the overvoltage backdown circuit 317 and the current command reduced for the next cycle.

The switch cycling continues until the output voltage reaches the required level. The system operates with a variable frequency but approximately constant turn off time controlled by the resonant circuit Lp and capacitor 308. The turn on time is controlled by the input voltage and the T1 transformer ratio. Operation with high duty cycles, say ten to one on to off ratio, is only limited by switch 301 collector voltage swing and so the topology is excellent for wide input voltage ranges.

As the output voltage rises to the required value the voltage comparator 310 output falls thus reducing the current command and the system falls into regulation.

The approximately constant switch turn off time leads to an approximately constant drop in inductor 305 inductor current during switch 301 turn off, which is ((Toff)(Vout))/IL1 where Toff is the switch off time, Vout the output voltage and IL1 the inductance of inductor 305. Thus the control of the peak switch current accurately controls the output current but with a constant offset equal to ((Toff)(Vout))/2(IL1). This offset has no effect on the ac loop stability which is consequently similar to that for an hysteretic current mode control.

Current limiting in the switching transistor 301 collector current is inherent in the maximum voltage that can be supplied by the Current Command, and no external limiting circuitry is required. The overvoltage backdown circuit 317 also controls the output current as it prevents the switching transistor 301 voltage from exceeding its operating limits. This generally occurs at low input voltages and high duty cycles.

FIG. 4 shows typical waveforms for two different input values, a low voltage input in A and a higher voltage input in B. The upper set of waveforms represent the high energy condition for which switch 301 collector moves down to the negative input level following its resonant recovery. The lower set represent the low energy overswing condition for which the collector fails to move down to the negative input. Beginning with the upper set of waveforms the energy in the tuned circuit Lp capacitor 308 brings switch 301 collector down below input negative line, point A, so that energy is cycled through diode 309, point C to D, before switch 301 begins to draw collector current, Point E to F. The operating frequency for the higher input voltage condition is higher due to the shorter switch turn on time but similar overswing time.

Where there is insufficient energy in tuned circuit combination Lp and capacitor 308, to bring switch 301 collector voltage negative there is no recycled current in diode 304, C to D and switch 301 begins to draw collector current as soon as it is turned on at point E. In this case the collector current has a positive spike at point E as the remaining charge on capacitor 306 is drained through switch 301. It is therefore a less efficient operating mode unless additional circuitry is provided to discharge capacitor 308 through an inductor. In practice a single circuit will exhibit both operating modes under a variety of line and load variations.

Figure 5:
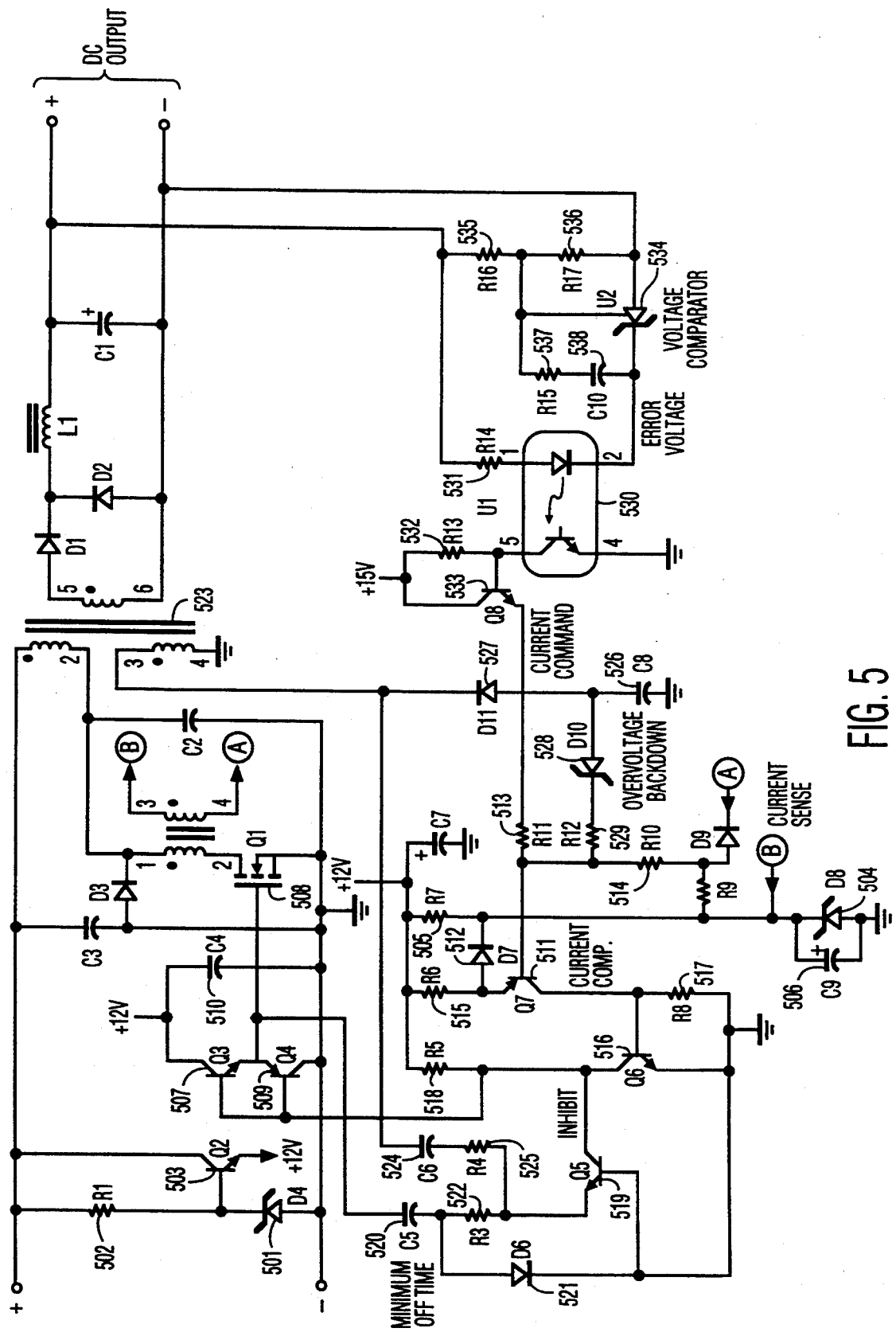
FIG. 5 shows a full schematic diagram of a circuit in accordance with one embodiment of the present invention.

The circuit of FIG. 4 is shown in greater detail in FIG. 5. FIG. 5 may be considered with FIG. 3 to aid in an understanding of the operation of the individual blocks in a typical dc to dc converter in accordance with the present invention using an FET as a switching element.

1. Internal power supplies for the control circuits. (Not shown in FIG. 3.)
    a) R1, D4, Q2. Diode D4 (501) is a typically 12.6 volt zener diode biased by current from the positive input through resistor R1 (502). This provides a nominally 12.6 volt signal to transistor 503 which acts as an emitter follower to generate a 12 volt dc supply for the control circuits.
    b) Diode D8 (504) is typically a 6.2 volt zener diode supplied by current through resistor R7 (505) from the +12 volt supply to generate an intermediate reference voltage. Capacitor C9 (506) is a high frequency bypass capacitor.

2. Switch Drives. Q3, Q4, C4. This acts as a power buffer for the current comparator output. When the current comparator goes positive transistor 507 acts as an emitter follower to pull the gate of transistor 508 positive and overcome gate and miller capacitance effects. When the current comparator output goes towards the input negative, transistor 509 acts as an emitter follower to pull transistor 508 gate to its source voltage. Capacitor C4 510 is a high frequency bypass capacitor.

3. Current Comparator. R5, R6, R8, R11, R10, D7, Q6, Q7 and C7. This circuit takes the form of a comparator for which the base of transistor 511 is the positive input and diode D7 (512) cathode the negative input. The current command is connected to resistor R11 (513) and the current sense signal to resistor R10 (514). Current through resistor 513 pulls transistor 511 base positive; current through resistor 514 pulls it negative. When transistor 511 base is more positive than diode 504 reference voltage the current through resistor R6 (515) flows through diode 512 into diode 504 and transistor 511 is reversed biased and so draws no collector current. Transistor 516 is biased off by resistor R8 (517) and is turned off so that its collector is pulled positive by resistor R5 (518). Thus the current comparator output is positive. When transistor 511 base is less positive than diode 504 reference voltage, diode 512 becomes reverse biased and current through resistor 515 now flows into the emitter of transistor 511. The resulting collector current turns on transistor 516 pulling the collector down to the negative input level. Thus the current comparator output is negative.

4. Inhibit. This is a single grounded base transistor which operates when emitter current flows into one of two circuits, the minimum off time control and the overswing hold off control. The collector current of transistor 519 pulls resistor 518 down to the negative input voltage thus overriding the current comparator.

5. Minimum Off Time Control. C5, R3, D6. When the Switch Drive is positive capacitor C5 (520) charges through diode 521. When the drive moves negative the junction of diode 521 anode, capacitor 520 and resistor R3 (520) is carded negative. Current through resistor 522 flows into transistor 519 emitter inhibiting the current comparator output. This condition persists until capacitor 520 discharges sufficiently for resistor 518 to pull the current comparator output positive. The purpose of the minimum off time control is to hold the switching FET in the off state just after it has been turned off but before the voltage has risen sufficiently high for the resonant overswing to be registered. It is also useful in the extreme cases of no load, or short circuit load, where it prevents spurious operation.

6. Overswing Holdoff. C6, R4. When transistor 508 drain moves above the positive input voltage this circuit inhibits the current comparator output. At this time the voltage on transformer 523 lead 3 is negative and current through capacitor C6 (524), resistor R4 (525) from transistor 519 base pulls the current comparator output negative. Capacitor 524 acts as a dc blocking capacitor and may be used to alter the timing by selecting the time constant defined by resistor 525 and capacitor 524 to provide a phase shift.

In this simple arrangement the current comparator output is inhibited until transistor 508 drain falls below the positive input voltage at which time it is released. Circuit delays cause the actual turn on of transistor 508 to occur at a slightly later time when the drain voltage is close to the negative input level.

7. Transformer Voltage Sense. D11, D10, R12, C8. When transistor 508 drain exceeds the positive input level transformer 523 lead 3 goes negative, capacitor C8 (526) is charged negative through diode D11 (527) and is made large enough to retain the peak voltage between successive cycles. When this voltage exceeds the breakdown voltage of zener diode D10 (528) current is drawn through resistor R12 (529). This current subtracts from the current command current flowing in resistor 513 and so effectively lowers the current limit.

8. Isolated Coupling. Q8, R13, R14, U1. This particular circuit employs an optical coupler U1 (530). The error voltage causes a current to flow in the light emitting diode and resistor R14 (531) is included to make this coupling approximately linear. The opto transistor draws current from the +12 volt supply through resistor R13 (532), and the voltage here is termed the current command and it is buffered by emitter follower Q8 (533).

9. Reference Voltage and Voltage Comparator. U2, C10, R15, R16, R17. Regulator U2 (534) is a three terminal regulator having its own internal voltage reference. Resistor R16 (535) and resistor R17 (536) form a voltage divider from the converter's dc output. It is compared with the internal reference in regulator 534 with the error voltage appearing at the cathode. Resistor R15 (537), capacitor C10 (538) form a feedback network to control the ac gain. This is a current mode system and so does not require a more complex feedback control.

What is claimed is:

1. A resonant forward converter circuit for converting an input dc signal at an input port having positive and negative terminals to an output dc signal at an output port having positive and negative terminals comprising a switching transistor, a transformer having primary and secondary windings said switching transistor and said transformer primary winding being connected in a series path across said input port, a capacitor arranged to form a resonant circuit with said transformer primary winding, an output regulator circuit connected between said output port and said transformer secondary winding for regulating said output voltage and control means comprising means responsive to said switching transistor for generating a current sense signal which is proportional to the current carded by said switching transistor when said switching transistor is in its on state, means responsive to said output dc signal for generating a current command signal which is proportional to the current required by said switching transistor in its on state, switch control means for comparing said current sense signal and said current command signal and for generating an output signal for maintaining said switching transistor in the on state when said current command signal is greater than said current sense signal and for generating signals for maintaining said switching transistor in the off state when said current sense signal is greater than said current command signal, and means for sensing the collector voltage of said switching transistor and for blocking said output signals for maintaining said switching transistor in the on state when said collector voltage is less than a predetermined value.

2. A circuit as in claim 1 wherein said switch control means further comprises an inhibit gate which is controllably enabled by said switch control for comparing said current sense signal and said current command signal.

3. A circuit as in claim 2 wherein said switch control means further comprises a switch drive circuit for converting signals from said inhibit gate into signals compatible with said switching transistor.

4. A circuit as in claim 3 further comprising means for inhibiting said inhibit gate when the resonant voltage of said switching transistor exceeds a fixed value.

5. A circuit as in claim 4 wherein said current command signal is a positive voltage signal and said current sense signal is a negative voltage signal.

6. A circuit as in claim 5 further comprising comparator means for storing signals corresponding to the negative value of the peak resonant voltage of said switching transistor and for reducing said current command signal when the sum of said stored signal and said switching transistor collector voltage exceeds a predetermined positive value.

7. A resonant forward dc to dc converter circuit for converting an input dc signal at an input port having a positive and a negative terminal to an output dc signal at an output port having a positive and a negative terminal comprising a first transformer having primary, auxiliary and secondary windings, one pin of said primary winding being connected to said input positive terminal, a second transformer, one pin of which is connected to the second pin of said first transformer primary winding, a switching transistor, the collector of which is connected to the second pin of said second transformer and the emitter of which is connected to said input negative terminal, a capacitor connected between said second transformer primary first pin and said input negative terminal, a first diode, the cathode of which is connected to said second transformer first primary pin and the anode of which is connected to said input negative terminal, a second diode the anode of which is connected to the first pin of said first transformer secondary winding, an inductor connected between said second diode cathode and said output positive terminal, a third diode the cathode of which is connected to said second diode cathode and the anode of which is connected to said output negative terminal, a capacitor, connected between said positive and negative output terminals, means connected across the secondary of said second transformer secondary winding for generating a current sense signal responsive to the voltage at said switching transistor collector, means for generating a current command signal in response to the difference between signals at said output port and a reference signal, means for comparing said current command signal with said current sense signal and for generating a signal for controllably biasing said switching transistor on, and transformer voltage sensing means connected across said first transformer auxiliar winding for generating a signal when said switching transistor collector voltage is below a reference level for controllably biasing said switching transistor off.

8. A circuit as in claim 7 further comprising means for generating a signal in response to said switching transistor switching from its on state for maintaining said switching transistor in its off state for a fixed interval.

* * * * *